United States Patent

Rountree et al.

[11] Patent Number: 6,016,876
[45] Date of Patent: Jan. 25, 2000

[54] WEED EXTRACTOR

[76] Inventors: Barbara P. Rountree; Robert N. Rountree, both of 3816 Kimbrough, Plano, Tex. 75025

[21] Appl. No.: 09/149,429

[22] Filed: Sep. 8, 1998

Related U.S. Application Data

[60] Provisional application No. 60/058,451, Sep. 8, 1997.

[51] Int. Cl.<sup>7</sup> ...................................................... A01B 1/18
[52] U.S. Cl. ........................................ 172/378; 294/50.8
[58] Field of Search ................................... 172/371, 375, 172/378, 379, 21; 294/50.8, 50.9, 50.6, 50.7, 60, 115, 116

[56] References Cited

U.S. PATENT DOCUMENTS

| | | | |
|---|---|---|---|
| 1,328,063 | 1/1920 | St John | 172/371 |
| 1,501,965 | 7/1924 | Moors | 294/50.8 |
| 3,865,348 | 2/1975 | Close | 254/132 |
| 3,909,054 | 9/1975 | Lazzari et al. | 294/50.9 |
| 3,918,757 | 11/1975 | Huber | 294/50.9 |
| 3,952,812 | 4/1976 | Lucan | 172/375 |
| 3,976,282 | 8/1976 | Baker | 254/132 |
| 3,985,382 | 10/1976 | Wheeler | 294/50.6 |
| 3,990,146 | 11/1976 | Asselta | 30/134 |
| 4,057,277 | 11/1977 | Burkholder | 294/50.8 |
| 4,243,206 | 1/1981 | Heikkinen et al. | 254/132 |
| 4,274,619 | 6/1981 | Redmond | 254/132 |
| 4,281,866 | 8/1981 | Atcheson | 294/50.5 |
| 4,389,065 | 6/1983 | Atkinson | 294/50.8 |
| 4,400,029 | 8/1983 | Delpidio | 294/50.9 |
| 4,473,248 | 9/1984 | Preradovich | 294/50.8 |
| 4,547,010 | 10/1985 | Camp | 294/50.9 |
| 4,603,744 | 8/1986 | Ramirez | 172/25 |
| 4,673,165 | 6/1987 | Nelson et al. | 254/132 |
| 4,715,634 | 12/1987 | Mueller et al. | 294/50.5 |
| 4,791,995 | 12/1988 | Hochlan, Jr. | 172/21 |
| 4,822,088 | 4/1989 | Price | 294/50.7 |
| 4,846,286 | 7/1989 | McNeely et al. | 172/379 |
| 4,905,768 | 3/1990 | Lorenz | 172/25 |
| 4,930,825 | 6/1990 | Dearman | 294/50.9 |
| 4,986,588 | 1/1991 | Price | 294/50.7 |
| 5,004,283 | 4/1991 | Sullivan | 294/61 |
| 5,154,465 | 10/1992 | Pakosh | 294/50.8 |
| 5,193,871 | 3/1993 | Williams | 294/61 |
| 5,234,241 | 8/1993 | Ikerd | 294/50.8 |
| 5,409,281 | 4/1995 | Price | 294/50 |
| 5,452,767 | 9/1995 | Smotherman | 172/25 |
| 5,456,449 | 10/1995 | Smith | 254/132 |

Primary Examiner—Robert E. Pezzuto
Attorney, Agent, or Firm—Robert N. Rountree

[57] ABSTRACT

A weed extractor is designed with a shaft (100) having a handle end and a distal end. A foot piece (116) has a first end and a second end. The first end is slidely attached to the shaft proximal to the distal end. The foot piece extends laterally from the shaft. A bit assembly (118) has a plurality of pivotally mounted opposed spikes. The bit assembly has an open position and a closed position, and moves between the open position and the closed position in response to movement of the foot piece with respect to the shaft. At least two opposed spikes are spaced apart from a plane bisecting an angle between the at least two opposed spikes in the open position. A part of each of the at least two opposed spikes intersects the plane in the closed position.

20 Claims, 4 Drawing Sheets

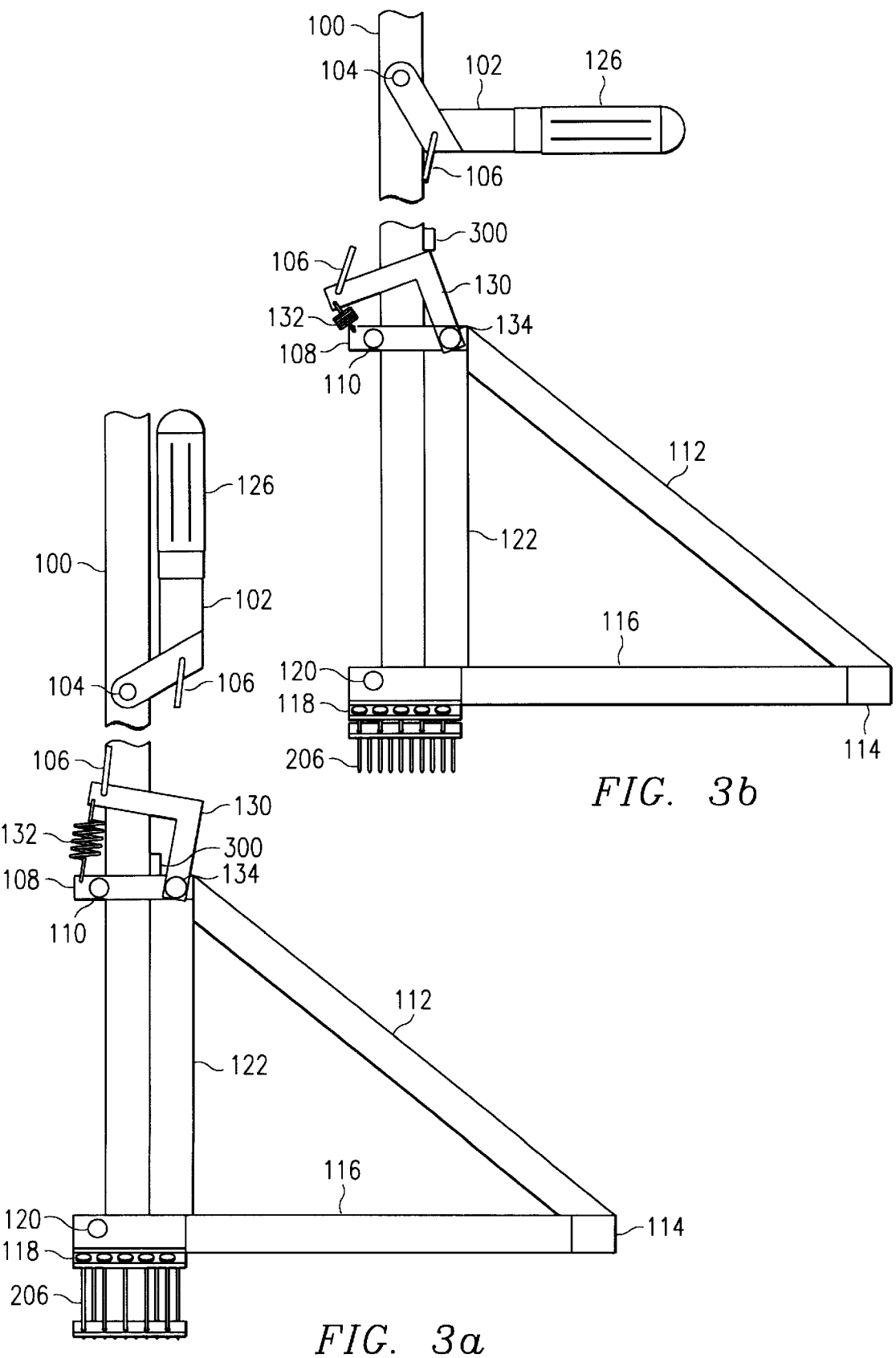

WEED EXTRACTOR

CLAIM TO PRIORITY OF PROVISIONAL APPLICATION

This application claims priority under 35 U.S.C. § 119(e)(1) of provisional application No. 60/058,041, filed Sep. 8, 1997.

FIELD OF THE INVENTION

This invention relates to lawn and garden tools and more particularly to a manual plant or weed extractor.

BACKGROUND OF THE INVENTION

Weeds affect many lawns at some time. A use of chemical means to control these weeds, however, may damage or destroy the existing lawn. Although most broadleaf weeds are easily eliminated from lawns by treatment with commercially available broadleaf weed killer, grassy weeds are much more difficult to remove. Annual grassy weeds such as crabgrass, grassburs and winter grasses may be controlled by application of pre-emergent weed killers in late winter and again in late spring without damage to existing lawns. Perennial grassy weeds such as dallisgrass and johnsongrass may be controlled in bermuda lawns by careful and repeated application of MSMA or DSMA in late spring or early summer. Most treatments for perennial grassy weeds in St. Augustine lawns, however, are ineffective. Although spot treatment with MSMA, DSMA or glyphosate may kill the weeds, it will also kill large patches of the St. Augustine lawn.

Many weed pullers have been developed to remove weeds from lawns or gardens where chemical means are ineffective. Some of these weed pullers have jaws or blades that pinch or grab the upper part of the weed and attempt to pull it from the soil. These weed pullers may be effective against individual weeds in sandy or loamy soil. They are ineffective, however, in dense soil such as clay against weeds with extensive root systems such as dallisgrass and johnsongrass. Often the grasping action of the jaws or blades damages a weed so that a subsequent attempt to pull the weed simply results in decapitation. Alternatively, the weed pullers with prongs or spikes may not effectively grab the weed and lose a grip on the weed during the attempted extraction. Another problem with pronged or forked weed pullers arises due to the space between the prongs or forks. When extraction of weed groups is attempted, the prongs or forks may separate the weed into may small sections that slip between the prongs or forks and remain firmly rooted in the ground. Yet another problem with these weed pullers is that they require the user to constantly bend and lift to extract the weed from the ground. Rotary weed pullers present yet another problem. They twist the top of the weed with respect to the weed's root system and may decapitate the weed leaving much of the root system in the ground. A final problem with many of these weed pullers is due to ineffective leverage provided for extraction even if the weed is properly grasped. Thus, repeated use is often difficult and exhausting work.

SUMMARY OF THE INVENTION

These problems are resolved by a weed extractor, comprising a shaft having a handle end and a distal end. A foot piece has a first end and a second end. The first end is slidely attached to the shaft proximal to the distal end. The foot piece extends laterally from the shaft. A bit assembly has a plurality of pivotally mounted opposed spikes. The bit assembly has an open position and a closed position, and moves between the open position and the closed position in response to movement of the foot piece with respect to the shaft. At least two opposed spikes are spaced apart from a plane bisecting an angle between the at least two opposed spikes in the open position. A part of each of the at least two opposed spikes intersects the plane in the closed position.

The present invention captures the weed when the bit assembly moves from the open position to the closed position. The opposed spikes close under the weed to minimize damage to the weed prior to extraction.

BRIEF DESCRIPTION OF THE DRAWINGS

A more complete understanding of the invention may be gained by reading the subsequent detailed description with reference to the drawings wherein:

FIG. 3A is a side view of the embodiment of FIG. 1 of the present invention with the bit assembly in the open position;

FIG. 3B is a side view of the embodiment of FIG. 1 of the present invention with the bit assembly in the closed position.

DETAILED DESCRIPTION OF THE PREFERRED EMBODIMENTS

Figure 1:
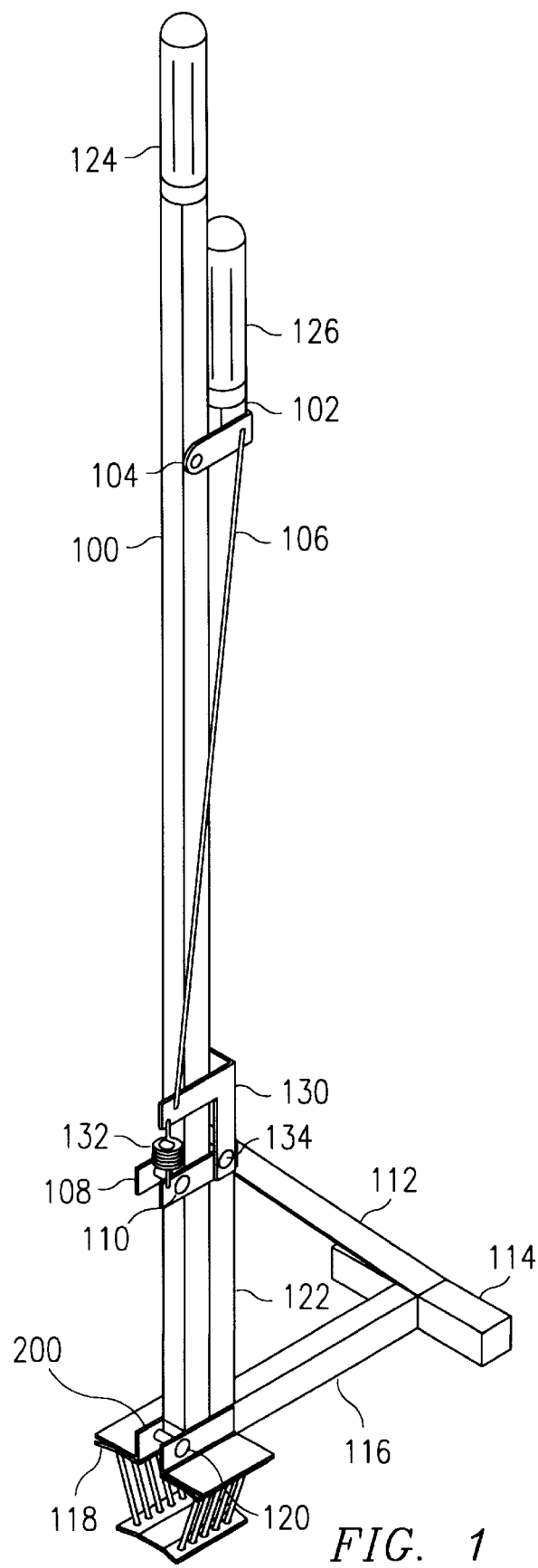
FIG. 1 is a perspective view of an embodiment of a weed extractor of the present invention.

Referring now to FIG. 1, an embodiment of a weed extractor of the present invention will be described in detail. The weed extractor includes an elongated shaft 100 having a handle end 124. The elongated shaft and other components of the weed extractor are preferably made from ¾ inch square steel tubing. A bit assembly 118 is attached to the distal end of the elongated shaft. A handle piece 102 is pivotally mounted on elongated shaft 100 by pin 104. Control piece 106 is pivotally attached to handle piece 102 and detent piece 130. Detent piece 130 is pivotally mounted to upright member 122 by pin 134. Detent piece 130 is moved to a first position by spring 132. Detent piece 130 is moved to a second position via control member 106 in response to a force applied to handle piece 102. A foot piece 116, having extended tabs 200, is slidely attached at a first end to the elongated shaft by pin 120. The foot piece extends laterally from the elongated shaft. The foot piece is held in this lateral position by upright member 122, having tabs 108. The upright member 122 and tabs 108 are slidely attached to the elongated shaft by pin 110. Triangulation between the foot piece and the upright piece 122 is accomplished by diagonal member 112. Fulcrum piece 114 is centrally attached to a second end of foot piece 116 and to diagonal member 112 so that fulcrum piece 114 is perpendicular to foot piece 116.

Attachment of foot piece 116 to the elongated shaft by pins 120 and 110 and triangulation by diagonal member 112 is highly advantageous in providing a rigid foot piece for operating the bit assembly from an open position to a closed position even in dense soil such as clay. The rigidity of this foot piece permits application of substantial force in effecting closure of the bit assembly. Furthermore, this operation of the foot piece for closing the bit assembly greatly reduces the effort required to capture a weed. A further advantage of this rigid foot piece is that it provides support for fulcrum piece 114 during weed extraction. This fulcrum piece 114 provides more surface area than the end of foot piece 116 for extraction of difficult weeds without damage to surrounding turf grass. Moreover, a distance from the handle end 124 of the elongated shaft is preferably at least four times a distance between the bit assembly 118 and the fulcrum piece 114. Thus, a force applied to handle end 124 of the elongated shaft 100 with respect to fulcrum piece 114 will preferably have an advantage of leverage over a loaded bit assembly of at least four. This further advantage minimizes the effort required to extract the weed after it is captured by bit assembly 118. Furthermore, this advantage of leverage substantially eliminates the need for bending or lifting during weed extraction.

Figure 2A:
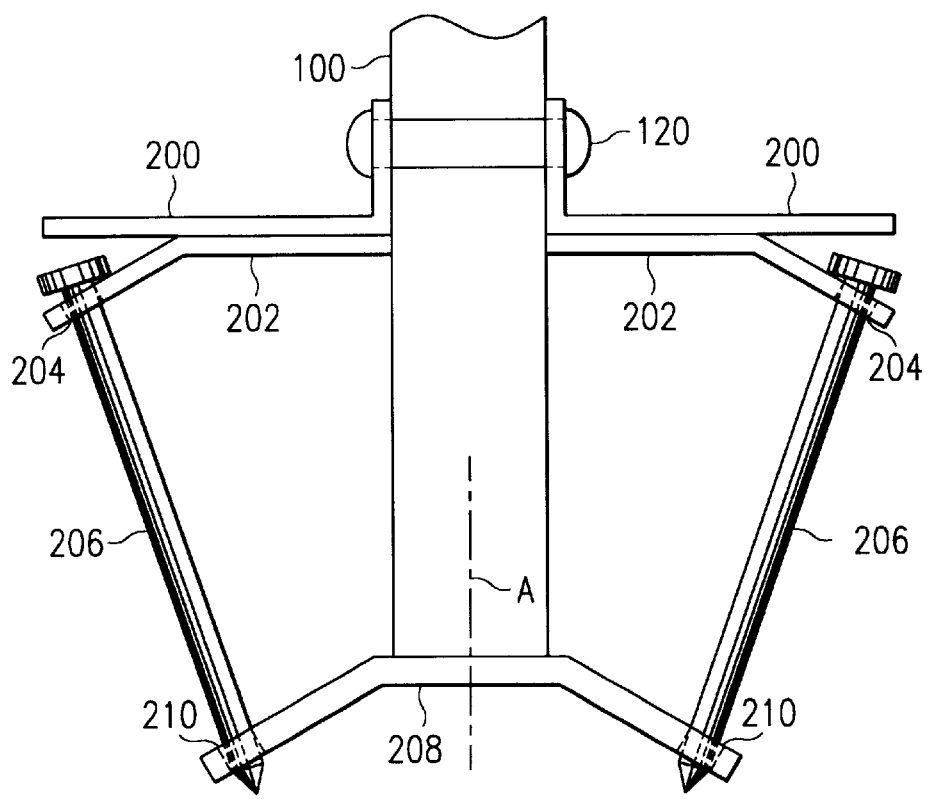
FIG. 2A is a front view of a bit assembly of the present invention in an open position.
Figure 2B:
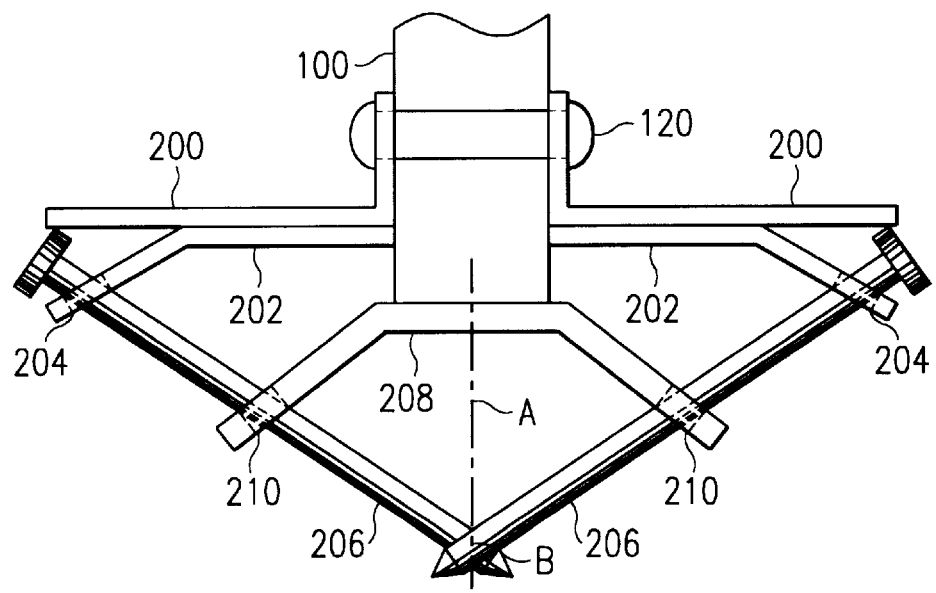
FIG. 2B is a front view of the bit assembly of the present invention in a closed position.

Referring now to FIG. 2A and FIG. 2B, operation of a bit assembly of the instant invention will be explained in detail. The bit assembly of FIG. 2A is in the open position. An upper alignment device 202 is attached to the lower side of extended tabs 200. This upper alignment device 202 includes holes 204 for pivotally connecting one end of opposed spikes 206 to the bit assembly. Preferably the opposed spikes 206 include five spikes 206 on one side of the bit assembly and five spikes 206 on the other side of the bit assembly. From the front view, however, only two opposed spikes 206 are visible. A lower alignment device 208 is connected to the distal end of elongated shaft 100. This lower alignment device 208 includes holes 210 for guiding the other end of opposed spikes 206 during movement between the open and closed positions. In this open position, elongated shaft 100 is extended to a position below extended tabs 200. Thus, spikes 206 are spaced apart from a plane A that bisects an angle between spikes 206.

In operation, lower alignment device 208 is placed on top of a weed to be captured. Foot pressure is applied to foot piece 116 (FIG. 1), thereby forcing extended tabs 200 and upper alignment device 202 to slide down elongated shaft 100 to a position near lower alignment device 208 (FIG. 2B). During this sliding motion, extended tabs 200 and upper alignment device 202 apply a force to upper ends of opposed spikes 206. Opposed spikes 206 slide through holes 210 in response this force. The lower ends of opposed spikes 206 are guided along their respective trajectories to a closed position B. In this closed position B, the lower ends of the opposed spikes 206 intersect a plane A that bisects an angle between the opposed spikes 206.

This closed position B is highly advantageous for capturing a weed prior to extraction. The spikes do not grasp or pinch the weed. Rather, the spikes enclose the weed from below. Thus, the weed is not damaged, and subsequent extraction greatly reduces a likelihood of decapitating the weed. Furthermore, the lower ends of opposed spikes 206 intersect plane A forming an interdigitated pattern of opposed spikes 206 below the body of the weed, thereby capturing the weed between opposed spikes 206 and lower alignment device 208 and precluding premature release of the weed. Finally, these interdigitated spikes are closely spaced to support the body of the weed during extraction, thereby reducing a likelihood of tearing the weed into multiple pieces during extraction.

A subsequent return of bit assembly 118 to the open position is effected by application of an upward force on upper alignment device 202 with respect to lower alignment device 208. This upward force retracts spikes 206 through holes 210 to the open position (FIG. 2A). This retraction of spikes 206 through holes 210 advantageously cleans spikes 206. The retraction of spikes 206 also releases the weed, which is then ejected when the bit assembly 118 is returned to the open position.

Referring now to FIG. 3A and FIG. 3B, operation of handle piece 102 and detent piece 130 will be described in detail. In an upper position (FIG. 3A), handle piece 102 corresponds to an open position of bit assembly 118. Handle piece 102 is pivotally connected to elongated shaft 100 by pin 104. Handle piece 102 is further pivotally connected to one end of control piece 106. Control piece 106 is preferably formed from a ⅛ inch diameter steel rod. The other end of control piece 106 is attached to detent piece 130 having a three-sided cross section. Detent piece 130 is pivotally attached at two opposing sides to upright member 122 by pin 134. Detent piece 130 is further attached to tab 108 by spring 132. Detent stop 300 is attached to elongated shaft 100 to provide a stop for a third side of detent piece 130.

In operation, bit assembly 118 is placed over a weed to be captured. Pressure is applied to foot piece 116 causing it to slide down elongated shaft 100, thereby capturing the weed as previously described. This downward motion of foot piece 116 and upright member 122 exerts a downward force on detent piece 130 and control piece 106, thereby forcing handle piece 102 into a horizontal position corresponding to a closed position of bit assembly 118 (FIG. 3B). In this closed position of bit assembly 118, the top of the third side of detent piece 130 is below detent stop 300. Spring 132 exerts a force on detent piece 130, thereby moving detent piece 130 from a first position to a second position against elongated shaft 100 and under detent stop 300. In this second position, the bit assembly is held in a closed position.

This horizontal position of handle piece 102 and second position of detent piece 130 are highly advantageous during extraction of the weed. Handle 102 may be rotated slightly about the axis of elongated shaft 100 to loosen the soil prior to weed extraction. Moreover, detent 130 remains wedged against detent stop 300, thereby maintaining a firmly closed position of bit assembly 118 after the weed is captured. This firmly closed position is necessary to extract mature weeds, such as dallisgrass, which may require more than 80 pounds of vertical force for extraction. This 80 pounds of vertical force for extraction, for example, is achieved through an advantage of leverage of preferably at least four by application of 20 pounds of lateral force at the handle end 124 of elongated shaft 100. This vertical force is applied to bit assembly 118 to extract the captured weed and root system.

Finally, after the weed is extracted, the bit assembly 118 of the weed extractor may be placed over a receptacle (not shown) and handle piece 102 may be rotated to the upright position. Initial rotation of handle piece 102 to the upright position disengages detent piece 130 from detent stop 300. Further rotation of handle piece 102 applies a vertical force to upright member 122 via detent piece 130, thereby returning bit assembly 118 to an open position and ejecting the weed. Thus, a further advantage of the weed extractor is that the entire procedure of weed capture, extraction and ejection may be completed with little effort while the user remains standing in an upright position.

Figure 4:
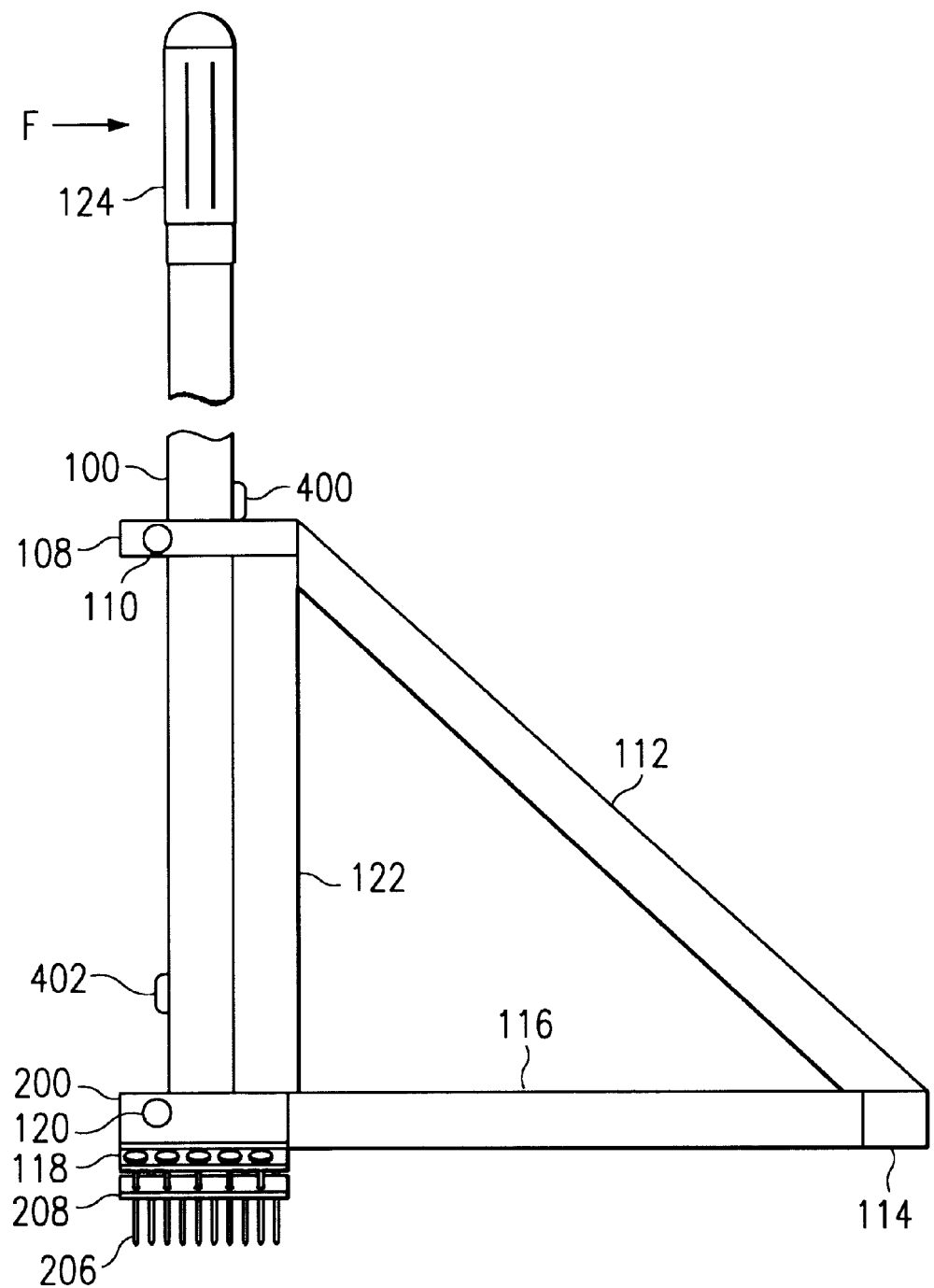
FIG. 4 is a side view of another embodiment of a weed extractor of the present invention with the bit assembly in the closed position.

Referring now to FIG. 4, there is a side view of another embodiment of a weed extractor of the present invention with the bit assembly in the closed position. Where applicable, reference numerals are consistent with the previously described embodiment. In this embodiment, a detent piece 400 and stop piece 402 are affixed to elongated shaft 100. Pin 110 slidely connects upright member 122 and tabs 108 to elongated shaft 100. Pin 110 is placed to provide sliding clearance for detent piece 400. Pin 120 also slidely connects tabs 200 and foot piece 116 to elongated shaft 100. Pin 120, however, is placed to limit the travel of foot piece 116 at stop piece 402. This limited travel keeps the lower ends of spikes 206 within the respective alignment holes of lower alignment device 208.

In operation, foot piece 116 is raised by upward pressure on diagonal member 112 to a position where pin 120 contacts stop piece 402, corresponding to the open position of bit assembly 118. In this open position, pin 110 is above detent piece 400. Pressure is applied to foot piece 116 to move bit assembly 118 to a closed position and effect capture of the weed. In this closed position, pin 110, tabs 108 and upright member 122 are below detent piece 400 and the weed is captured. Force F is applied to the front of the handle end 124 of elongated shaft 100 to begin extraction of the captured weed. The upper end of upright member 122 is restrained by detent piece 400 and hold bit assembly 118 in a closed position. Force applied to handle end 124 is transferred to fulcrum piece 114 through diagonal member 112, thereby preferably providing an advantage of leverage of at least four, to the distal end of elongated shaft 100. The top of upright member 122 remains engaged with detent piece 400, thereby maintaining bit assembly 118 in a closed position during weed extraction. After extraction, the bit assembly is positioned over a proper receptacle and upward pressure is applied to diagonal member 112. Initial upward pressure slightly separates the top of upright member 122 from elongated shaft 100 due to the sliding clearance provided by the position of pin 110. Further upward pressure returns the bit assembly to the open position, thereby ejecting the weed. This is highly advantageous in providing a simplified detent piece for maintaining the bit assembly in a closed position during extraction.

Although the invention has been described in detail with reference to a preferred embodiment, it is to be understood that this description is by way of example only and is not to be construed in a limiting sense. Many alternative materials might be used to construct a weed extractor of the instant invention. For example, elongated shaft 100 and upright member 122 might be concentric tubes. Alternatively, fulcrum piece might be round or another convenient shape providing sufficient surface area for levered extraction. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. An extractor, comprising:
   a shaft having a handle end and a distal end;
   an elongated foot piece having a first end and a second end, the first end slidely attached to the shaft proximal to the distal end;
   a bit assembly attached to the distal end of the shaft, the bit assembly having a plurality of pivotally mounted opposed spikes, the bit assembly having an open position and a closed position, the bit assembly moving between the open position and the closed position in response to movement of the foot piece with respect to the shaft;
   a detent stop connected to one of the shaft and the foot piece; and
   a detent piece connected to the other of the shaft and the foot piece, the detent piece having a first position and a second position, the detent piece engaged with the detent stop in the first position, thereby holding the bit assembly in the closed position, the detent piece disengaged from the detent stop in the second position, thereby permitting movement of the bit assembly between the open position and the closed position.

2. An extractor as in claim 1, wherein the bit assembly further comprises:
   an upper alignment device connected to the foot piece, one end of each of the plurality of opposed spikes pivotally connected to the upper alignment device; and
   a lower alignment device connected to the distal end of the shaft, the lower alignment device arranged for guiding the plurality of opposed spikes between the open position and the closed position in response to movement of the foot piece with respect to the shaft.

3. An extractor as in claim 2, wherein the lower alignment device includes a plurality of holes for guiding each respective spike of the plurality of opposed spikes.

4. An extractor as in claim 2, wherein the opposed spikes form an angle less than ninety degrees in the open position and wherein the angle is greater than ninety degrees in the closed position.

5. An extractor as in claim 1, wherein the shaft is elongated such that a force applied to the handle end of the shaft with respect to the second end of the foot piece has an advantage of leverage of at least four over the bit assembly.

6. An extractor as in claim 5, further including a fulcrum piece attached to the second end of the foot piece, the fulcrum piece extending perpendicular to the foot piece.

7. An extractor as in claim 1, further comprising:
   a handle piece pivotally connected to the shaft proximal to the handle end, the handle piece having a first position and a second position; and
   a control piece having a first end connected to the handle piece, the control piece having a second end coupled to the detent piece.

8. An extractor as in claim 1, wherein the plurality of pivotally mounted opposed spikes comprises a first set of adjacent spikes and a second set of adjacent spikes and wherein each spike is spaced apart from an adjacent spike by at least a diameter of a circle circumscribing a cross section of the spike.

9. An extractor as in claim 7, wherein movement of the handle piece from the first position to the second position closes the bit assembly for capturing a weed, and wherein movement of the handle piece from the second position to the first position opens the bit assembly for ejecting the weed.

10. An extractor including a bit assembly having an open position and a closed position, the bit assembly comprising:
    an upper alignment device;
    a lower alignment device;
    a detent stop operatively connected to one of the upper and lower alignment devices;
    a detent piece operatively connected to the other of the upper and lower alignment devices, the detent piece having a first position and a second position, the detent piece engaged with the detent stop in the first position, thereby holding the bit assembly in the closed position, the detent piece disengaged from the detent stop in the second position, thereby permitting movement of the bit assembly between the open position and the closed position;

a first set of substantially parallel and adjacent spikes having a first end attached to the upper alignment device and having a second end aligned with the lower alignment device; and a second set of substantially parallel and adjacent spikes opposite the first set, the second set having a first end attached to the upper alignment device and having a second end aligned with the lower alignment device.

11. An extractor as in claim 10, further comprising a shaft having a handle end and a distal end, wherein the lower alignment device is attached to the distal end of the shaft and the upper alignment device is slidely attached to the shaft above the lower alignment device.

12. An extractor as in claim 11, further comprising an elongated foot piece having an end attached to the upper alignment device.

13. An extractor as in claim 11, further including a spring for moving the detent piece from the first position to the second position.

14. An extractor as in claim 11, further comprising a control piece connected to the detent piece, the control piece arranged to move the detent piece between the first and the second position.

15. An extractor as in claim 14, further comprising a handle piece pivotally mounted proximate the handle end of the shaft and connected to the control piece.

16. An extractor, comprising:

a shaft having a handle end and a distal end;

a bit assembly to the distal end of the shaft, the bit assembly having a plurality of opposed spikes, the bit assembly having an open position and a closed position;

an elongated foot piece having a first end and a second end, the first end attached to the shaft proximal to the distal end, the second end providing a fulcrum for transferring a force applied to the handle end of the shaft to the bit assembly; and a detent stop connected to one of the shaft and the elongated foot piece;

a detent piece pivotally attached between the shaft proximal to the distal end and the bit assembly, wherein a force having a first direction engages the detent piece with the detent stop, thereby holding the bit assembly in the closed position, and a force having a second direction disengages the detent piece from the detent stop, thereby releasing the bit assembly from the closed position.

17. An extractor as in claim 16, further including a spring arranged to apply the force having the first direction.

18. An extractor as in claim 16, further comprising a control piece connected to the detent piece, the control piece arranged to apply the force having the second direction.

19. An extractor as in claim 16, wherein each spike of the plurality of opposed spikes has a substantially round cross section.

20. An extractor as in claim 16, wherein the plurality of opposed spikes comprises a first set of at least two substantially parallel spikes and a second set of at least two substantially parallel spikes opposed to the first set, wherein the first and second sets are spaced apart from a plane bisecting an angle between the first and second sets in the open position, and wherein a part of each of the spikes of the first and second sets intersects the plane in the closed position.

* * * * *